United States Patent
Mukuno et al.

(10) Patent No.: US 6,761,301 B2
(45) Date of Patent: Jul. 13, 2004

(54) SOLDERING MACHINE

(75) Inventors: Hideki Mukuno, Hitachiohta (JP); Kazumi Tashiro, Hitachinaka (JP); Hideaki Arita, Mito (JP); Kiyoshi Kanai, Hitachinaka (JP); Teruo Okano, Sayama (JP); Fumihiro Yamashita, Nakano (JP); Shoichirou Matsuhisa, Sayama (JP); Hidekazu Imai, Sayama (JP)

(73) Assignees: Hitachi, Ltd., Tokyo (JP); Tamura/FA System Co., Ltd., Saitama (JP); Hitachi Car Engineering Co., Ltd., Ibaraki (JP); Tamura Corporation, Tokyo (JP)

( * ) Notice: Subject to any disclaimer, the term of this patent is extended or adjusted under 35 U.S.C. 154(b) by 6 days.

(21) Appl. No.: 10/097,610

(22) Filed: Mar. 15, 2002

(65) Prior Publication Data

US 2002/0100791 A1 Aug. 1, 2002

Related U.S. Application Data

(62) Division of application No. 09/732,939, filed on Dec. 11, 2000, now Pat. No. 6,412,681.

(30) Foreign Application Priority Data

Dec. 10, 1999 (JP) .......................... 11-351468

(51) Int. Cl.⁷ .............................. B23K 1/00; F27B 5/00

(52) U.S. Cl. ...................... 228/42; 432/202; 432/249

(58) Field of Search ................... 228/219, 222, 228/42, 43, 46; 432/36, 48, 120, 200, 201, 202, 233, 247, 249; 219/388, 391, 395, 400

(56) References Cited

U.S. PATENT DOCUMENTS 4,164,642 A 8/1979 Ebert
4,919,729 A * 4/1990 Elmgren et al.

(List continued on next page.)

FOREIGN PATENT DOCUMENTS

DE 44010790 4/1995
EP 0307319 3/1989

(List continued on next page.)

OTHER PUBLICATIONS

Catalogue of Electrovert's Soldering Machine (3 sheets) (no date).
Catalogue of Soltec's Soldering Machine (3 sheets) (no date).
Catalogue of Conceptronic's Soldering Machine (2 sheets) (no date).
Catalogue of BTU International's Soldering Machine (2 sheets) (no date).
Copy of the search report (no date).

Primary Examiner—Kiley Stoner
(74) Attorney, Agent, or Firm—Crowell & Moring LLP

(57) ABSTRACT

A soldering machine using lead-free solders is provided which can uniformly heat a printed circuit board and electronic parts to be mounted thereon, and which can solder the electronic parts without thermally damaging them. A porous member having a number of holes formed therein is disposed between a blower fan and a heater for making uniform the pressure of a fluid. A radiation plate is disposed between the heater and a heating target for blowing the fluid having been heated by the heater to the heating target in the form of a turbulent flow. The heated fluid is blown to the heating target for heating the same, whereby solder is melted.

4 Claims, 6 Drawing Sheets

U.S. PATENT DOCUMENTS

| | | | |
|---|---|---|---|
| 5,028,399 A | * | 7/1991 | Suppelsa et al. |
| 5,154,338 A | * | 10/1992 | Okuno et al. ............... 228/42 |
| 5,567,151 A | * | 10/1996 | Mizoguchi et al. ......... 432/145 |
| 5,579,981 A | * | 12/1996 | Matsumura et al. |
| 6,354,481 B1 | * | 3/2002 | Rich et al. .................. 228/19 |
| 6,412,681 B2 | * | 7/2002 | Mukuno et al. |
| 2002/0100791 A1 | * | 8/2002 | Mukuno et al. |

FOREIGN PATENT DOCUMENTS

| | | | |
|---|---|---|---|
| EP | 0461961 | | 12/1991 |
| JP | 406114548 A | * | 4/1994 |
| JP | 6-253465 | | 9/1994 |
| JP | 9-186448 | | 7/1997 |
| JP | 11-54903 | | 9/1997 |
| JP | 10-335047 | | 12/1998 |
| JP | 11054903 | | 2/1999 |

* cited by examiner

FIG.4
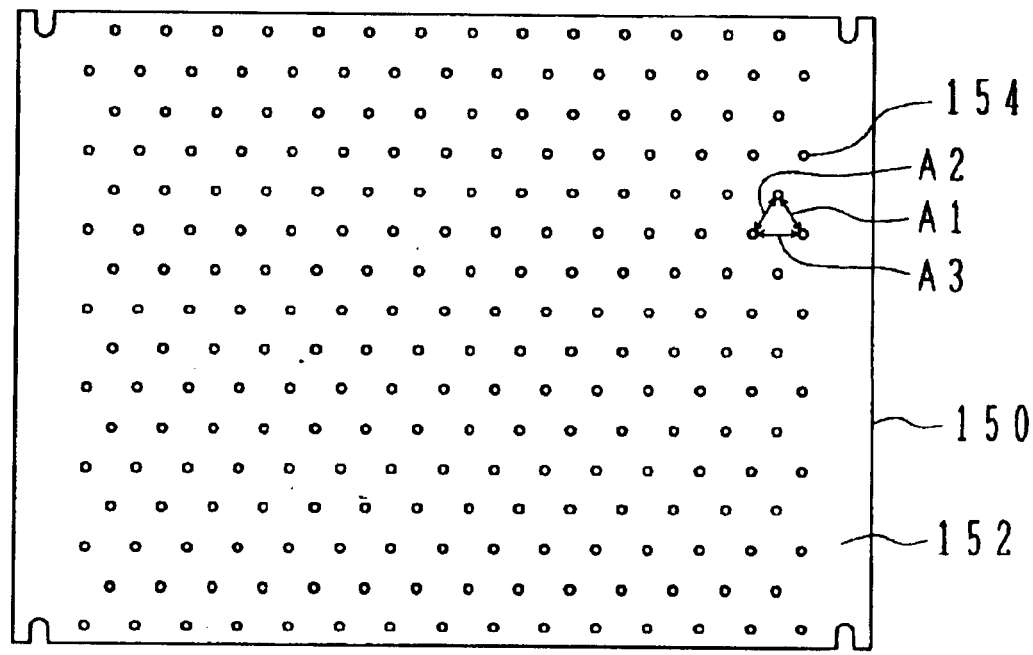
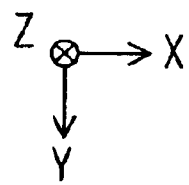

SOLDERING MACHINE

This application is a divisional of application Ser. No. 09/732,939, filed Dec. 11, 2000 now U.S. Pat. No. 6,412,681.

BACKGROUND OF THE INVENTION

1. Field of the Invention

The present invention relates to a soldering machine, and more particularly to a soldering machine suitable for use with lead-free solders.

2. Description of the Related Art

In conventional soldering machines, heat sources are employed for heating solder up to temperatures higher than the melting point of the solder. Known examples of such a heat source include an infrared heater for directly heating a target to be heated as disclosed in JP,A 6-253465 and JP,A 10-335047, for example, and a fluid that is heated by an infrared heater and blown toward a target to be heated, as disclosed in JP,A 11-54903 and JP,A 9-186448, for example.

From the standpoint of suppressing environmental pollution, it has been recently tried to employ, as solders for use in soldering machines, lead-free solders containing no lead instead of the conventional solder containing lead. As lead-free solders, there are known tin-silver (SnAg) solder, tin-copper (SnCu) solder, tin-silver (SnAg) solder added with bismuth (Bi), and so on. These lead-free solders have the molting points higher than that of the conventional lead solder. For example, the melting point of the SnAg solder is 221° C., the melting point of the SnCu solder is 227° C., and the melting point of the SnAg solder added with Bi is 205° C. Thus, the melting points of the lead-free solders are in the range of 200 to 230° C. higher than that of the conventional lead solder.

On the other hand, electronic parts soldered onto a printed circuit board include chip parts such as SOP (Small Outline Package) type ICs, QFP (Quad Flat Package) type ICs, resistors and capacitors, as well as electrolytic capacitors. Some of those soldered parts have the endurable temperatures near the melting points of the lead-free solders. The endurable temperature of an aluminum electrolytic capacitor, for example, is 250° C. Therefore, in the case of soldering the aluminum electrolytic capacitor with a solder having the melting point of 227° C., the solder is required to be heated up to a level of, e.g., 230° C. higher than the melting point of the solder. On the other hand, taking into account the endurable temperature of the electronic part to be mounted on a printed circuit board, the heating temperature is required to be kept not higher than 240° C. Thus, the heating temperature must be controlled so as to fall within the range of 230 to 240° C.

However, when an infrared heater is used to directly heat a target to be heated as disclosed in the above-cited JP,A 6-253465 and JP,A 10-335047, there occurs a difference in temperature of the heated target under an influence of the configuration of the infrared heater. Accordingly, heating solder up to a level higher than the melting point of the solder may result in that electronic parts to be mounted on a printed circuit board are partly heated beyond their endurable temperatures. In such an event, the electronic parts are thermally damaged. Also, when a fluid heated by an infrared heater is blown toward a target to be heated as disclosed in the above-cited JP,A 11-54903 and JP,A 9-186448, a variation in temperature distribution of the heated target is smaller than that resulting when an infrared heater is used to directly heat a target to be heated. It is however difficult to realize uniform heating over the entirety of a printed circuit board and electronic parts to be mounted thereon, which are objects subjected to the heating, so that the heating temperature is held within the range of 230 to 240° C. Such a difficulty has accompanied a problem that the electronic parts may be thermally damaged.

SUMMARY OF THE INVENTION

Accordingly, it is an object of the present invention to provide a soldering machine using lead-free solders, which can uniformly heat a printed circuit board and electronic parts to be mounted thereon, and which can solder the electronic parts without thermally damaging them.

(1) To achieve the above object, the present invention provides a soldering machine including a heating furnace unit in which a fluid supplied from a blower is heated by a heater and the heated fluid is blown to a heating target to heat the heating target, wherein the heating furnace unit comprises a porous member disposed between the blower and the heater for making uniform pressure of the fluid supplied from the blower, the porous member having a number of holes formed therein to allow the fluid to flow through the porous member toward the heater; and a radiation plate disposed between the heater and the heating target for blowing the fluid having been heated by the heater to the heating target in the form of a turbulent flow.

In the thus-constructed soldering machine using lead-free solders, a printed circuit board and electronic parts to be mounted thereon can be uniformly heated, and the electronic parts can be soldered without thermally damaging them.

(2) In above (1), preferably, the heating furnace unit further comprises an absorber provided on a surface of at least one of the radiation plate and the heater on the side facing the heating target, the absorber absorbing those of infrared rays emitted from the heater which have wavelengths not longer than 1 $\mu$m and not shorter than 20 $\mu$m.

With that construction, a far infrared ray with the wavelength of 1 $\mu$m to 20 $\mu$m is irradiated to the heating target. Therefore, the temperatures of ICs, etc. even in the form of black molded packages can be easily controlled so that the package temperatures are kept below the endurable level.

(3) In above (1), preferably, a plurality of the heating furnace units are connected in the direction of feed of the heating target, and a stream of the fluid is formed to flow in a direction opposite to the direction of feed of the heating target.

With that construction, a lowering of the temperature in the soldering section can be prevented.

(4) In above (1), preferably, the soldering machine further includes a cooling unit for cooling the heating target having been heated by the heating furnace unit, the cooling unit comprising a blower for blowing a cooling fluid to the heating target; a cooler for cooling the fluid of which temperature has increased after cooling the heating target; and a porous member disposed between the blower and the heating target for making uniform pressure of the fluid supplied from the blower, the porous member having a number of holes formed therein to allow the fluid to flow through the porous member toward the heating target.

With that construction, since the heating target is subjected to quick cooling after being heated, it is possible to produce a finer structure inside the solder, suppress growth of an acicular $Ag_3Sn$ crystal within the solder, and prevent a soldering failure that conductors and electronic parts of the heating target are peeled off from the soldered points.

(5) In above (1), preferably, a plurality of the cooling units are connected in the direction of feed of the heating target, and a stream of the fluid is formed to flow in a direction opposite to the direction of feed of the heating target.

With that construction, since a stream of the cooling fluid is formed to flow in a direction opposite to the direction of the heating target, consumption of inert gas used as the cooling fluid can be reduced.

BRIEF DESCRIPTION OF THE DRAWINGS

FIG. 4 is a plan view showing the construction of a radiation plate for use in the heating furnace unit of the soldering machine according to one embodiment of the present invention;

DESCRIPTION OF THE PREFERRED EMBODIMENTS

The construction of a soldering machine according to one embodiment of the present invention will be described below with reference to FIGS. 1 to 6.

Figure 1:
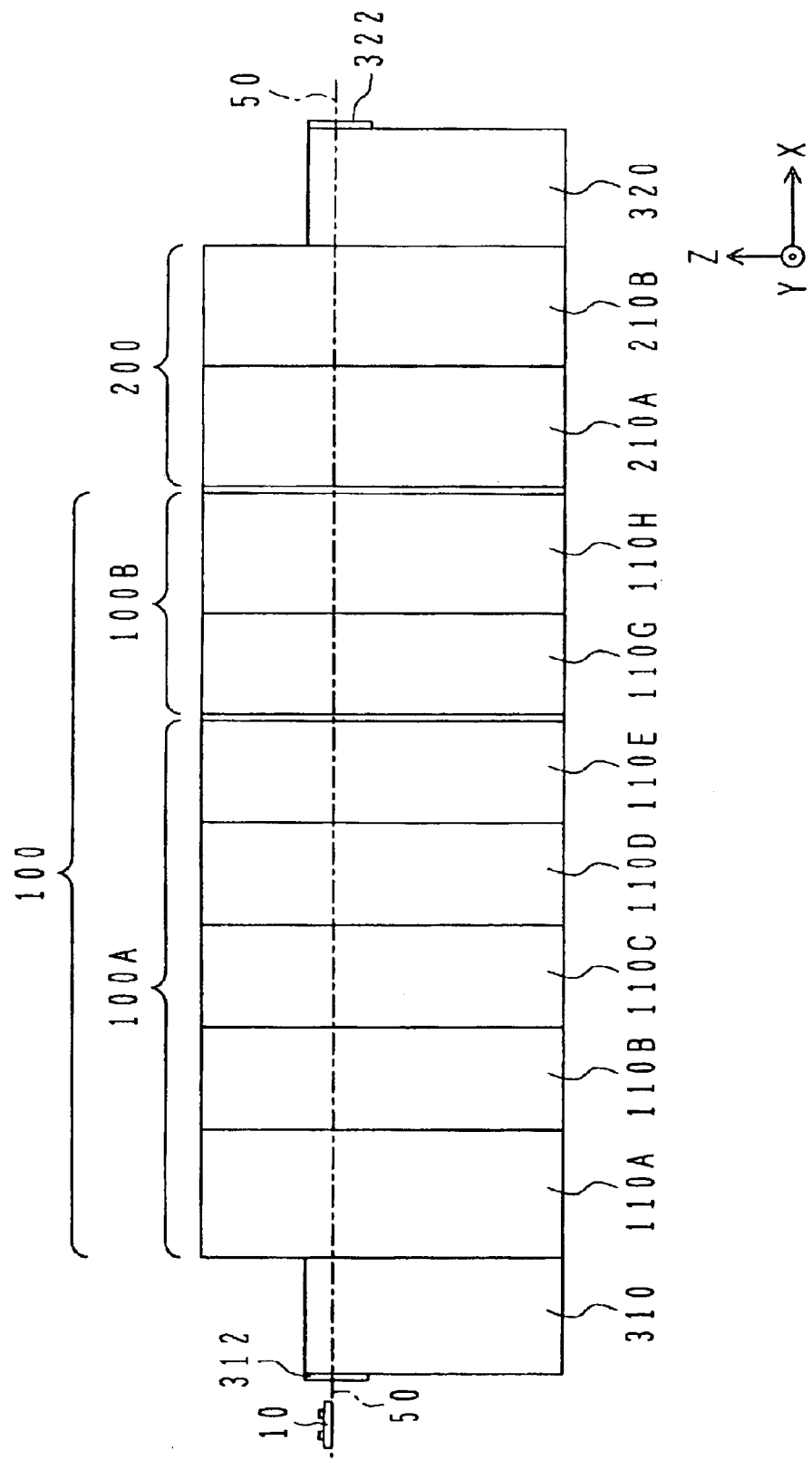
FIG. 1 is a front view showing the overall construction of a soldering machine according to one embodiment of the present invention.

A description is first made of the overall construction of the soldering machine according to this embodiment with reference to FIG. 1.

FIG. 1 is a front view showing the overall construction of the soldering machine according to one embodiment of the present invention.

The soldering machine comprises a continuous heating furnace section 100, a cooling section 200, inert gas chambers 310, 320, and a feed conveyor 50, which cooperate to constitute a reflow furnace. The continuous heating furnace section 100 comprises a pre-heating section 100A and a soldering section 100B. The pre-heating section 100A is made up of heating furnace units 110A, 110B, 110C, 110D and 110E, while the soldering section 100B is made up of heating furnace units 110G and 110H. These heating furnace units 110A, ..., 110H are all basically of the same construction. The detailed construction of the heating furnace units 110A, ..., 110H will be described later with reference to FIGS. 3 and 4. The pre-heating section 100A heats a target 10 to be heated up to the range of, e.g., 160 to 200° C. for pre-heating of the target 10, i.e., a heating target that comprises a printed circuit board and electronic parts mounted on the printed circuit board. The soldering section 100B further heats the heating target 10 up to a temperature of, e.g., 240° C. higher than the melting point of solder for melting the solder so that the electronic parts are soldered onto the printed circuit board.

The cooling section 200 is made up of two cooling units 210A, 210B. These cooling units 210A, 210B are basically of the same construction. The detailed construction of the cooling units 210A, 210B will be described later with reference to FIG. 5. The cooling section 200 rapidly cools the heating target 10, which has been heated up to, e.g., 240° C., down to the normal temperature so that the solder is hardened, thereby completing the soldering process.

The inert gas chamber 310 has an opening/closing gate 312 provided on the entry side. The inert gas chamber 320 has an opening/closing gate 322 provided on the exit side. The opening/closing gates 312, 322 are each in the form of a curtain or a door capable of being selectively opened and closed. The opening/closing gates 312, 322 are opened respectively when the heating target 10 transported by the feed conveyor 50 is carried into the inert gas chamber 310 and when it is carried out of the inert gas chamber 320, enabling the heating target 10 to be carried into and out of the inert gas chambers. The opening/closing gates 312, 322 are otherwise closed to prevent inert gas, e.g., nitrogen gas, in the continuous heating furnace section 100, the cooling section 200 and the inert gas chambers 310, 320 from flowing out to the exterior. The inert gas is introduced to inner spaces of the continuous heating furnace section 100, the cooling section 200 and the inert gas chambers 310, 320 for minimizing surface oxidation of the solder when it is melted.

The operation of the soldering machine according to this embodiment will be described below.

The heating target 10 is carried into the inert gas chamber 310 by the feed conveyor 50. The opening/closing gate 312 is opened when the heating target 10 is carried into the inert gas chamber 310, and is closed after it has been carried into the inert gas chamber 310. The heating target 10 is then transported to the pre-heating section 100A of the continuous heating furnace section 100 by the feed conveyor 50. Inner atmospheres of the heating furnace units 110A, 110B, 110C, 110D and 110E of the pre-heating section 100A are each held at, e.g., 180° C. The heating target 10 transported through the pre-heating section 100A by the feed conveyor 50 is gradually heated in the heating furnace units 110A, 110B, 110C, 110D and 110E. In the heating furnace unit 110E, the heating target 10, which comprises the printed circuit board and the electronic parts mounted thereon, is finally heated up to the temperature (e.g., 180° C.) of the inner atmosphere.

Next, the heating target 10 is transported to the soldering section 100B of the continuous heating furnace section 100 by the feed conveyor 50. Inner atmospheres of the heating furnace units 110G, 110H of the soldering section 100B are each held at, e.g., 240° C. The heating target 10 transported through the soldering section 100B by the feed conveyor 50 is further heated in the heating furnace units 110G, 110H. In the heating furnace unit 110H, the heating target 10, which comprises the printed circuit board and the electronic parts mounted thereon, is finally heated up to the temperature (e.g., 240° C.) of the inner atmosphere.

Thereafter, the heating target 10 is transported to the cooling section 200 by the feed conveyor 50. Inner spaces of the cooling units 210A, 210B of the cooling section 200 are each held in a low temperature state by air and inert gas that are cooled down to, e.g., 30° C. The heating target 10 transported through the cooling section 200 by the feed conveyor 50 is cooled down to, e.g., 60 to 80° C. by the cooling unit 210A and then to, e.g., 30° C. by the cooling unit 210B.

The heating target 10 having been cooled down to the normal temperature is carried out of the inert gas chamber 320 by the feed conveyor 50. The opening/closing gate 322 is opened when the heating target 10 is carried out of the inert gas chamber 320, and is closed after it has been carried out of the inert gas chamber 320.

One example of the heating target, on which soldering is performed by the soldering machine according to this embodiment, will now be described with reference to FIG. 2.

Figure 2:
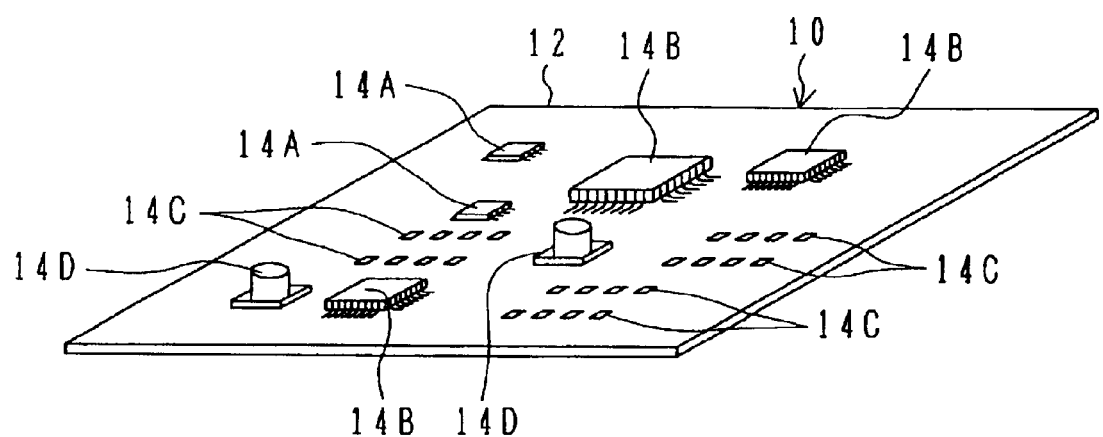
FIG. 2 is a perspective view showing one example of construction of a target to be heated, on which soldering is performed by the soldering machine according to one embodiment of the present invention.

FIG. 2 is a perspective view showing one example of construction of a target to be heated, on which soldering is performed by the soldering machine according to one embodiment of the present invention.

The heating target 10 comprises a printed circuit board 12 and electronic parts 14 that are mounted and soldered thereon. In preceding steps, a lead pattern is formed on the printed circuit board 12 and solder pastes are printed in positions of the printed circuit board 12 where the electronic parts 14 are to be mounted. The electronic parts 14 may be, for example, SOP type ICs 14A, QFP type ICs 14B, other chip parts 14C such as resistors and capacitors, as well as electrolytic capacitors 14D. Of these electronic parts, an aluminum electrolytic capacitor, for example, has the endurable temperature of 250° C. In addition, as a result of conducting studies, the inventors found that, for the SOP type IC 14A in the form of a black molded package, easiness (or difficulty) in temperature control depends on the wavelength of an infrared ray irradiated to the package. More specifically, an infrared ray with the wavelength of not longer than 1 μm tends to be more easily absorbed by the black molded package. The use of such an infrared ray, therefore, makes it difficult to control the temperature of the black molded package to a predetermined value because of a too quick increase of the package temperature. Further, an infrared ray with the wavelength of not shorter than 20 μm tends to be hardly absorbed by the black molded package. The use of such an infrared ray, therefore, also makes it difficult to control the temperature of the black molded package to a predetermined value because of a too slow increase of the package temperature.

The construction of the heating furnace unit 110 used in the soldering machine according to this embodiment will be described below with reference to FIGS. 3 and 4.

Figure 3:
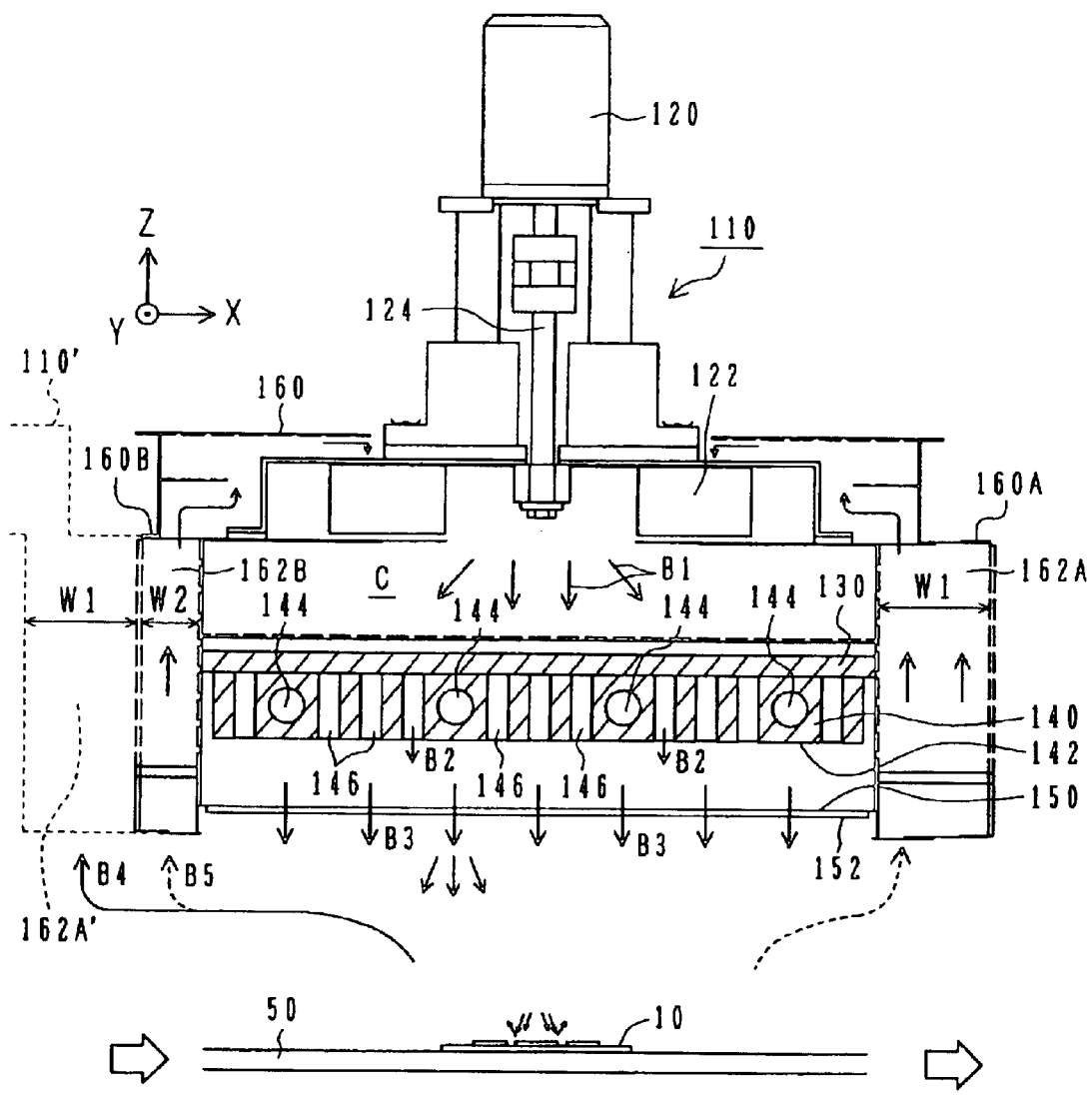
FIG. 3 is a sectional view showing the construction of a heating furnace unit used in the soldering machine according to one embodiment of the present invention.

FIG. 3 is a sectional view showing the construction of a heating furnace unit used in the soldering machine according to one embodiment of the present invention. X-, Y- and Z-axes shown in FIG. 3 are identical respectively to X-, Y- and Z-axes shown in FIG. 1. The heating furnace unit 110 shown in FIG. 3 is represented as a sectional view of each of the heating furnace units 110A, . . . , 110H shown in FIG. 1 taken along an X-Z plane.

FIG. 4 is a plan view showing the construction of a radiation plate for use in the heating furnace unit of the soldering machine according to one embodiment of the present invention.

The heating furnace unit 110 in this embodiment includes, as a mechanism for blowing a fluid, a motor 120 and a blower fan 122. The blower fan 122 is coupled to a rotary shaft of the motor 120 through a shaft 124. The shaft 124 is rotatably supported by a bearing (not shown). The heating furnace unit 110 in this embodiment further includes a porous plate 130, a cast heater 140, and a radiation plate 150. Surface treated portions 142, 152 are formed respectively on surfaces of the cast heater 140 and the radiation plate 150 on the side positioned to face the heating target 10. The cast heater 140 is constituted by bar heaters 144 that are cast in a body of the cast heater 140. Also, a plurality of slits 146 are formed in the cast heater 140. In addition, casings 160A, 160B are provided respectively at front and rear portions of the heating furnace unit 110 in the direction in which the heating target 10 is transported by the feed conveyor 50 (i.e., in the X-direction). Fluid passages 162A, 162B are formed respectively in the casings 160A, 160B.

Note that FIG. 3 shows the construction of an upper half of the heating furnace unit above the feed conveyor 50. In fact, a lower half of the heating furnace unit, which similarly comprises the motor 120, the blower fan 122, the porous plate 130, the cast heater 140, and the radiation plate 150, is provided below the feed conveyor 50. The upper and lower halves of the heating furnace unit heat the heating target 10 carried on the feed conveyor 50 from above and below.

The blower fan 122 rotated by the motor 120 sucks and pressurizes a fluid (e.g., air and inert gas) from the rear side thereof, and blows the pressurized fluid into a space C in directions indicated by arrows B1. The space C is a space defined by both the casings 160A, 160B and the porous plate 130. However, since a number of holes are formed in the porous plate 130, the space C is communicated with a lower space in which the cast heater 140 and the radiation plate 150 are provided. Thus, the space C is communicated with the lower space through only the porous plate 130, and therefore the fluid pressure within the space C is increased. The fluid under the increased pressure within the space C is forced to eject through a number of the holes formed in the porous plate 130 toward the radiation plate 150. The fluid having ejected through the porous plate 130 is heated by the cast heater 140 and then flows out of the slits 146 toward the radiation plate 150 (in a direction indicated by arrows B2).

As described above, the fluid pressurized by the blower fan 122 is ejected through the porous plate 130 after being further pressurized to a predetermined level in the space C. With the internal pressure of the space C increased to the predetermined level, even when there is a speed distribution in the fluid blown from the blower fan 122, a speed variation of the fluid ejecting through the porous plate 130 can be reduced so that the fluid is ejected through the porous plate 130 at a substantially constant speed. As a result, the fluid is ejected out of the slits 146 of the cast heater 140 at a high constant speed of, e.g., 20 m/s. Thus, in this embodiment, since the heated fluid is blown to the heating target 10 at a high speed, the efficiency of heat exchange is increased and the temperature of the heating target 10 can be rapidly increased.

An alloy of platinum (Pt)-copper (Cu)-manganese (Mn) is employed as a material of the porous plate 130. Using such an alloy enables the porous plate 130 to develop a catalytic action to decompose a flux. As described later, the heated fluid having been blown to the heating target 10 is returned to the space C by the blower fan 122 through the fluid passages 162. The solder on the heating target 10 generates a flux when melted, and the generated flux is also returned to the space C. The flux having deposited on the surface of the porous plate 130 is decomposed by the alloy of platinum (Pt)-copper (Cu)-manganese (Mn) that has the catalytic action to decompose the flux. The porous plate 130 can be therefore prevented from being clogged with the flux deposited thereon. Incidentally, the porous plate 130 may be detached from the heating furnace unit 110 so as to remove the flux deposited on the porous plate.

The construction of the radiation plate 150 will now be described with reference to FIG. 4.

A plurality of small holes 154 are formed in the radiation plate 150 such that each of the small holes 154 is positioned at an apex of a regular triangle and distances A1, A2 and A2 between the adjacent small holes at the apices are equal to each other. The diameter of each small hole 154 is selected to be in the range of (φ2 to (φ5 (mm). For example, the hole diameter is set to (φ3.5 (mm). In such a case, the distances A1, A2 and A2 between the adjacent small holes are each set to 20 (mm). By so dimensioning and arranging the small holes 154, the fluid can be ejected as a turbulent flow, which contains Karman vortices, from the radiation plate 150 in directions indicated by arrows B3. The fluid ejecting out of the slits 146 of the cast heater 140 is substantially a laminar flow that has a high constant speed of, e.g., 20 m/s as mentioned above. If such a high-speed fluid is blown to the heating target 10 while it remains in a laminar state, some of the heating target 10, i.e., the electronic parts on the printed circuit board, may be flipped away or shifted off from their proper positions by the fluid having a high speed. The electronic parts on the printed circuit board are merely rested on the solder pastes, which are printed on the printed circuit board, without being fixed in any way. Accordingly, the positions of the electronic parts are more likely to shift off upon blowing of the high-speed fluid. The radiation plate 150 having the small holes 154 formed therein is employed to prevent such position shifts of the electronic parts. In other words, the position shifts of the electronic parts are avoided by causing the high-speed fluid to be blown to the heating target 10 in the form of a turbulent flow after passing the radiation plate 150. Note that the small holes 154 are not limited to the above-described arrangement in which they are positioned at apices of regular triangles, but may be positioned at apices of isosceles triangles. Namely, the distances A1, A2 and A2 between the adjacent small holes 154 may be set so as to meet A1=A2 and A1>A3.

The temperature of the heated fluid blown out of the radiation plate 150 is detected by a temperature sensor, and an amount of power supplied to the cast heater 140 is controlled in accordance with the detected temperature. As a result, the temperature of the heated fluid can be controlled to a predetermined temperature (e.g., 180° C. in the pre-heating section 100A and 240° C. in the soldering section 10B).

The heated fluid having been blown to the heating target 10 is sucked by the blower fan 22 through the fluid passages 162A, 162B in the casings 160A, 160B for return to the space C. In this return arrangement, the fluid passage 162A has a width W1 set to be greater than a width W2 of the fluid passage 162B. Stated otherwise, the width W1 of the fluid passage 162A formed on the downstream side in the direction in which the heating target 10 is fed by the transport conveyor 50 is set to be greater than the width W2 of the fluid passage 162B formed on the upstream side in the direction of feed of the heating target 10. The width W1 is, e.g., 10 cm and the width W2 is, e.g., 20 cm. As shown in FIG. 1, the heating furnace units 110A, . . . , 110H are connected in tandem in the direction of feed of the heating target 10. Accordingly, as shown in FIG. 3, on the side upstream of one heating furnace unit 110 in the direction of feed of the heating target 10, a fluid passage 162A' of another adjacent heating furnace unit 110' connected in tandem to the one heating furnace unit 110 is located in a side-by-side relation to the fluid passage 162B of the one heating furnace unit 110. Since the fluid passage 162A' has a width W1 set to be greater than the width W2 of the fluid passage 162B, the heated fluid having been blown to the heating target 10 is sucked through the fluid passages 162A', 162B such that an amount of the fluid sucked to the adjacent heating furnace unit 110' as a flow indicated by arrow B4 is greater than an amount of the fluid sucked to the heating furnace unit 110 itself as a flow indicated by arrow B5. As a result, inside the heating furnace units 110A, . . . , 110H shown in FIG. 1, a stream of the fluid flowing from the heating furnace unit 110H toward the heating furnace unit 110A can be formed. The internal temperature of the heating furnace units 110A, . . . , 110E is lower than that of the heating furnace units 110G, 110H. Therefore, if a stream of the fluid flowing from the heating furnace unit 110E toward the heating furnace unit 110G is formed, the internal temperature of the heating furnace unit 110G would be lowered. However, since a stream of the fluid flowing from the heating furnace unit 110G toward the heating furnace unit 110E is formed, the internal temperature of the heating furnace units 110G, 110H can be prevented from lowering.

The function of the surface treated portions 142, 152 will be described below.

The surface treated portion 142 is constituted by a ceramic film formed on the surface of the cast heater 140 by thermal spraying. Likewise, the surface treated portion 152 is constituted by a ceramic film formed on the surface of the radiation plate 150 by thermal spraying. As mentioned above, it is found that, particularly for the SOP type IC 14A in the form of a black molded package, easiness in temperature control depends on the wavelength of an infrared ray irradiated to the package, and that more precise temperature control can be achieved by irradiating an infrared ray with the wavelength of not shorter than 1 μm but not longer than 20 μm to the heating target 10. The surface treated portions 142, 152 are employed to absorb infrared rays with the wavelengths except for the range of 1 to 20 μm so that the infrared ray with the wavelength in the range of 1 to 20 μm is irradiated to the heating target 10. Also, radiation of the infrared ray with the wavelength of not longer than 1 μm is suppressed by using aluminum as a material of surrounding the bar heaters 144 embedded in the cast heater 140 and a material of the radiation plate 150.

When the surface treated portions 142, 152 are each formed by thermal spraying as a film containing, e.g., alumina ($Al_2O_3$)-titania ($TiO_2$) as a main component, the infrared ray radiated from the surface treated portions 142, 152 has the wavelength of 9±1 (μm). The radiation rate at this radiation wavelength is 0.98 . Further, each surface treated portions 142, 152 has the endurable temperature of 540° C. and is hence sufficiently durable to use in the heating furnace unit. It was confirmed that, by thus irradiating the infrared ray with the radiation wavelength of 9±1 (μm) to the heating target 10 at the radiation rate of 0.98, a variation (ΔT) in temperature of the heating target having been heated could be held at 5° C. and the temperature of the heating target could be controlled to be in the range of 230 to 240° C.

Additionally, the ceramic film formed by thermal spraying may be, e.g., a sprayed ceramic film (wavelength of a radiated infrared ray: 12±1 (μm), radiation rate: 0.97) containing chromia ($Cr_2O_3$) as a main component. Other usable examples include a sprayed ceramic film (wavelength of a radiated infrared ray: 9±1 (μm), radiation rate: 0.93) containing alumina ($Alr_2O_3$) as a main component, a sprayed ceramic film (wavelength of a radiated infrared ray: 7±5 (μm), radiation rate: 0.85) containing titania ($TiO_2$) as a main component, a sprayed ceramic film (wavelength of a radiated infrared ray: 9±1 (μm), radiation rate: 0.98) containing alumina ($Al_2O_3$)-zirconia ($ZrO_2$) as a main component, and a sprayed ceramic film (wavelength of a radiated infrared ray: 11±2 (μm), radiation rate: 0.95) containing zirconia ($ZrO_2$)-yttria ($Y_2O_3$) as a main component.

While the above embodiment has been described as using the two surface treated portions 142, 152, only one of them may be used. For example, only the surface treated portion 152 may be used because it is formed on the surface of the radiation plate 150 comprising a thin plate and can be more easily formed by thermal spraying with a more inexpensive cost than the surface treated portion 142 formed on the surface of the cast heater 140.

The construction of the cooling unit 210 used in the soldering machine according to this embodiment will be described below with reference to FIG. 5.

Figure 5:
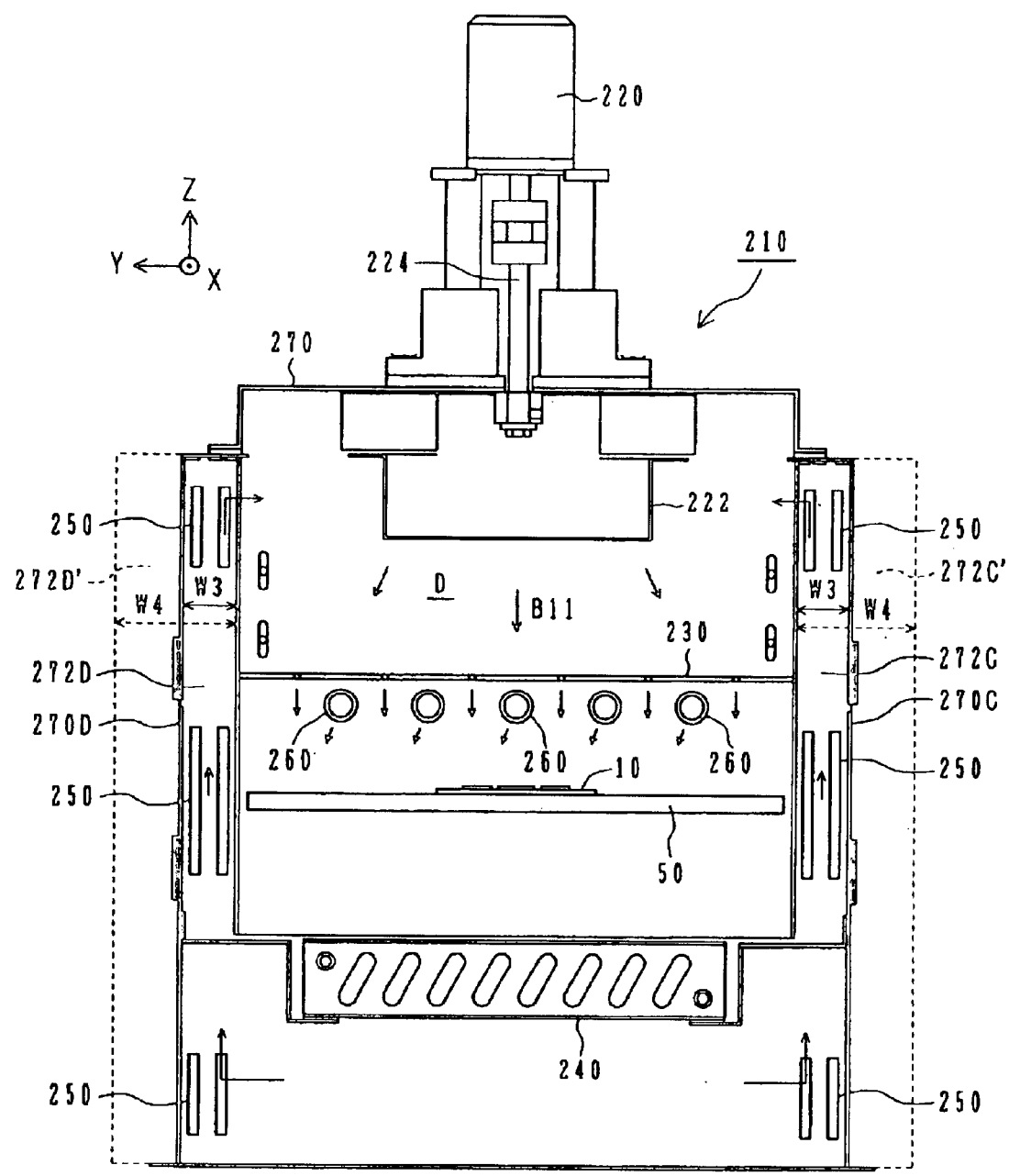
FIG. 5 is a sectional view showing the construction of a cooling unit used in the soldering machine according to one embodiment of the present invention.

FIG. 5 is a sectional view showing the construction of the cooling unit used in the soldering machine according to one embodiment of the present invention. X-, Y- and Z-axes shown in FIG. 5 are identical respectively to X-, Y- and Z-axes shown in FIG. 1. The cooling unit 210 shown in FIG. 5 is represented as a sectional view of each of the cooling units 210A, 210B shown in FIG. 1 taken along a Y-Z plane.

The cooling unit 210 in this embodiment includes, as a mechanism for blowing a fluid, a motor 220 and a blower fan 222. The blower fan 222 is coupled to a rotary shaft of the motor 220 through a shaft 224. The shaft 224 is rotatably supported by a bearing (not shown). The cooling unit 210 in this embodiment further includes a porous plate 230, a water-cooled heat exchanger 240, heat sinks 250, and inert gas pipes 260. Further, casings 270C, 270D are provided respectively on the right and left sides of the cooling unit 210 in a direction perpendicular to the direction in which the heating target 10 is transported by the feed conveyor 50 (i.e., in the Y-direction). Fluid passages 272C, 272D are formed respectively in the casings 270C, 270D.

The blower fan 222 rotated by the motor 220 sucks and pressurizes a fluid (e.g., air and inert gas) from the rear side thereof, and blows the pressurized fluid into a space D in directions indicated by arrows B11. The space D is a space defined by both the casings 270 and the porous plate 230. However, since a number of holes are formed in the porous plate 230, the space D is communicated with a lower space in which the feed conveyor 50 runs. Thus, the space D is communicated with the lower space through only the porous plate 230, and therefore the fluid pressure within the space D is increased. The fluid under the increased pressure within the space D is forced to eject through a number of the holes formed in the porous plate 230 toward the feed conveyor 50.

As described above, the fluid pressurized by the blower fan 222 is ejected through the porous plate 230 after being further pressurized to a predetermined level in the space D. With the internal pressure of the space D increased to the predetermined level, even when there is a speed distribution in the fluid blown from the blower fan 222, a speed variation of the fluid ejecting through the porous plate 230 can be reduced so that the fluid is ejected through the porous plate 230 at a substantially constant speed. Thus, in this embodiment, since the cooled fluid is blown to the heating target 10 at a high speed, the efficiency of heat exchange is increased and the temperature of the heating target 10 can be rapidly decreased. In other words, the heating target 10 is subjected to quick cooling after being heated. In addition, inert gas, such as nitrogen gas, is ejected through the inert gas pipes 260 and blown to the heating target 10 for cooling it. The temperature of the ejected inert gas is, e.g., 20° C.

An alloy of platinum (Pt)-copper (Cu)-manganese (Mn) is employed as a material of the porous plate 230. Using such an alloy enables the porous plate 230 to develop a catalytic action to decompose a flux. The flux having deposited on the surface of the porous plate 230 is decomposed by the alloy of platinum (Pt)-copper (Cu)-manganese (Mn) that has the catalytic action to decompose the flux. The porous plate 230 can be therefore prevented from being clogged with the flux deposited thereon. Incidentally, the porous plate 230 may be detached from the cooling unit 210 so as to remove the flux deposited on the porous plate.

The cooling fluid having been blown to the heating target 10 is sucked by the blower fan 222 through the fluid passages 272C, 272D in the casings 270C, 270D for return to the space D. The water-cooled heat exchanger 240 and the heat sinks 250 are arranged in return paths extending from the heating target 10 to the blower fan 222 so that the cooling fluid, whose temperature has increased after cooling the heating target 10, is cooled down again.

As shown in FIG. 1, the cooling section 200 comprises the two cooling units 210A, 210B connected in tandem in the direction in which the heating target 10 is transported by the feed conveyor 50. The cooling unit 210 indicated by solid lines in FIG. 5 is employed to constitute the cooling unit 210B (installed on the downstream side in the direction of feed of the heating target 10) in FIG. 1, wherein the fluid passages 272C, 272D are each formed to have a width W3. On the other hand, as indicated by dotted lines in FIG. 5, the cooling unit 210A, which is installed on the upstream side in the direction of feed of the heating target 10 and connected to the cooling unit 210B in a side-by-side relation, has fluid passages 272C', 272D' with a width 6 W4. The width W4 is set to be greater than the width W3. For example, the width W4 is 20 cm and the width W3 is 10 cm. Since the width W4 of the fluid passages 272C', 272D' is greater than the width W3 of the fluid passages 272C, 272D, the cooling fluid having been blown to the heating target 10 in the cooling unit 210B is sucked to the side of the adjacent cooling unit 210A in a larger amount than that sucked by the cooling unit 210B itself. As a result, inside the cooling units 210A, 210B shown in FIG. 1, a stream of the cooling fluid flowing from the cooling unit 210B toward the cooling unit 210A can be formed.

The inert gas chamber 320 having the opening/closing gate 322 provided on the exit side is installed downstream of the cooling unit 210B in the direction of feed of the heating target 10. When the heating target 10 is carried out of the soldering machine, it is unavoidable that the inert gas flows out through the opening/closing gate 322 of the inert gas chamber 320. In this embodiment, however, since a stream of the cooling fluid flowing from the cooling unit 210B toward the cooling unit 210A is formed, an outflow amount of the inert gas can be minimized. It is hence possible to reduce consumption of expensive inert gas.

Further, in this embodiment, since the cooling fluid is blown to the heating target in the form of a uniform flow at a high speed (flow rate), the efficiency of heat exchange in cooling the heating target is increased and the temperature of the heating target can be rapidly decreased. This quick cooling can not only produce a finer structure inside the solder, but also suppress growth of an acicular $Ag_3Sn$ crystal within the solder. In addition, the quick cooling is effective in preventing a soldering failure that conductors and electronic parts of the heating target are peeled off from the soldered points.

The construction of another heating furnace unit 110' used in the soldering machine according to this embodiment will be described below with reference to FIG. 6.

Figure 6:
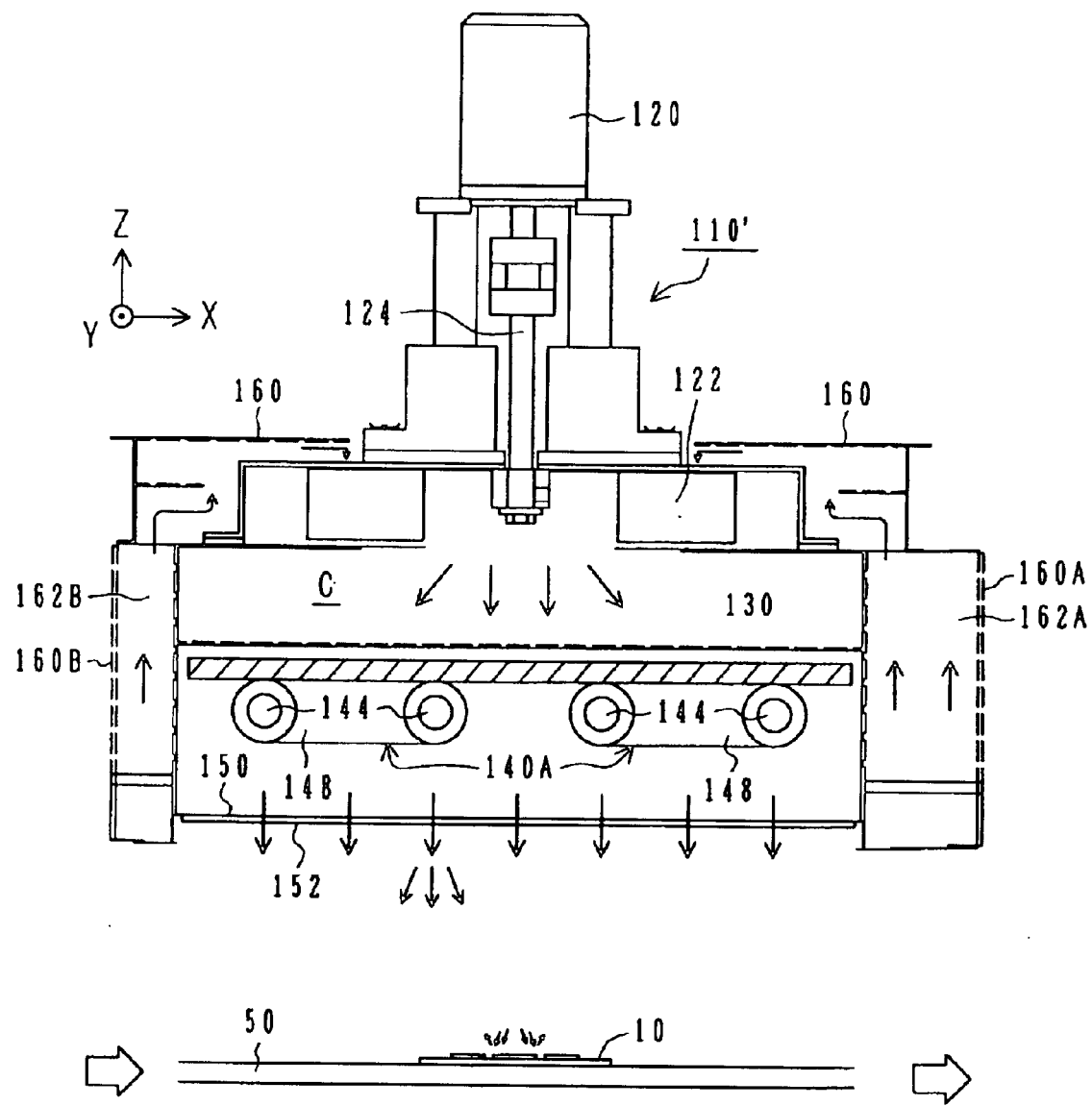
FIG. 6 is a sectional view showing the construction of another heating furnace unit used in the soldering machine according to one embodiment of the present invention.

FIG. 6 is a sectional view showing the construction of another heating furnace unit used in the soldering machine according to one embodiment of the present invention. X-, Y- and Z-axes shown in FIG. 6 are identical respectively to X-, Y- and Z-axes shown in FIG. 1. The heating furnace unit 110' shown in FIG. 6 is represented as a sectional view of each of the heating furnace units 110A, ..., 110H shown in FIG. 1 taken along an X-Z plane. Note that the same reference numerals in FIG. 6 as those in FIG. 3 denote the same components.

As with the heating furnace unit 110 shown in FIG. 3, the heating furnace unit 110' in this embodiment comprises the motor 120, the blower fan 122, the porous plate 130, and the radiation plate 150. This embodiment uses a heater 140A having a different construction from the cast heater 140.

The heater 140A comprises bar heaters 144 and radiating fins 148 attached to the bar heaters 144. The radiating fins 148 are each made up of a plurality of fin pieces that are arrayed side by side in the Y-direction on the drawing so as to evenly radiate infrared rays emitted from the bar heaters 144 over a large area. As an alternative, the radiating fin 148 may be in the form of a spiral fin wound around the bar heater 144.

With the embodiments, as described above, a high-speed, uniform fluid for heating is obtained by employing the porous plate to increase the fluid pressure and heating, by the heater, the fluid that flows out of a number of holes in the porous plate at a high uniform speed. Furthermore, the high-speed heating fluid is blown to a target to be heated (heating target) after passing the radiation plate employed to create a turbulent flow that contains Karman vortices. Accordingly, the heating target can be evenly heated at a high speed, and a difference in temperature of the heating target can be reduced. Such uniform heating is particularly advantageous in the case of using lead-free solder, i.e., when the difference between the melting point of solder and the endurable temperature of an electronic part is small. The uniform heating enables the lead-free solder to melt for soldering the electronic part without thermally damaging it.

Also, the surface treated portions are formed on the heater and/or the radiation plate for enabling a far infrared ray with the wavelength of 1 μm to 20 μm to be irradiated to the heating target. The temperatures of ICs, etc. even in the form of black molded packages can be therefore easily controlled so that the package temperatures are kept below the endurable level.

Further, in the heating section, since a stream of the heating fluid is formed to flow in a direction opposite to the direction of the heating target, the temperature in the soldering section can be prevented from lowering. Also, in the cooling section, since a stream of a cooling fluid is formed to flow in a direction opposite to the direction of the heating target, consumption of inert gas used as the cooling fluid can be reduced.

Additionally, since the heating target is subjected to quick cooling after being heated, it is possible to produce a finer structure inside the solder, suppress growth of an acicular $Ag_3Sn$ crystal within the solder, and prevent a soldering failure that conductors and electronic parts of the heating target are peeled off from the soldered points.

According to the present invention, in a soldering machine using lead-free solders, a printed circuit board and electronic parts to be mounted thereon can be evenly heated to perform soldering without thermally damaging the electronic parts.

What is claimed is:

1. A soldering machine including a heating furnace unit in which a fluid supplied from a blower is heated by a heater and the heated fluid is blown to a heating target to heat said heating target, wherein said heating furnace unit comprises:

a porous member disposed between said blower and said heater for making uniform pressure of the fluid supplied from said blower, said porous member having a number of holes formed therein to allow the fluid to flow through said porous member toward said heater, a radiation plate disposed between said heater and said heating target for blowing the fluid having been heated by said heater to said heating target in the from of a turbulent flow, a first fluid passage formed on a downstream side in the direction in which said heating target is fed, being sucked the heated fluid blown to said heating target therethrough by said blower, and having a width W1, and a second fluid passage formed on an upstream side in the direction in which said heating target is fed, being sucked the heated fluid blown to said heating target therethrough by said blower, and having a width W2 which is smaller than the width W1, whereby a stream of the fluid is formed to flow in a direction opposite to the direction of feed of said heating target when a plurality of said heating furnace units are connected in the direction of feed of said heating target.

2. A soldering machine according to claim 1, wherein said porous member is made of a material having a catalytic action for decomposing a flux, and said heating furnace units are comprised of an upper heating furnace unit at an upper side of said heating target and a lower heating furnace unit at a lower side of said heating target, and each of said upper and lower heating furnace units being comprised of one of said blowers, said heaters, said porous member and said radiation plates.

3. A soldering machine according to claim 1, wherein said porous member being made of a material having a catalytic action for decomposing a flux, and a stream of the fluid is formed to flow in a direction opposite to the feed direction.

4. A soldering machine according to claim 1, wherein said porous member being made of an alloy of platinum (Pt)-copper (Cu)-manganese (Mn).

* * * * *